Figure 4:
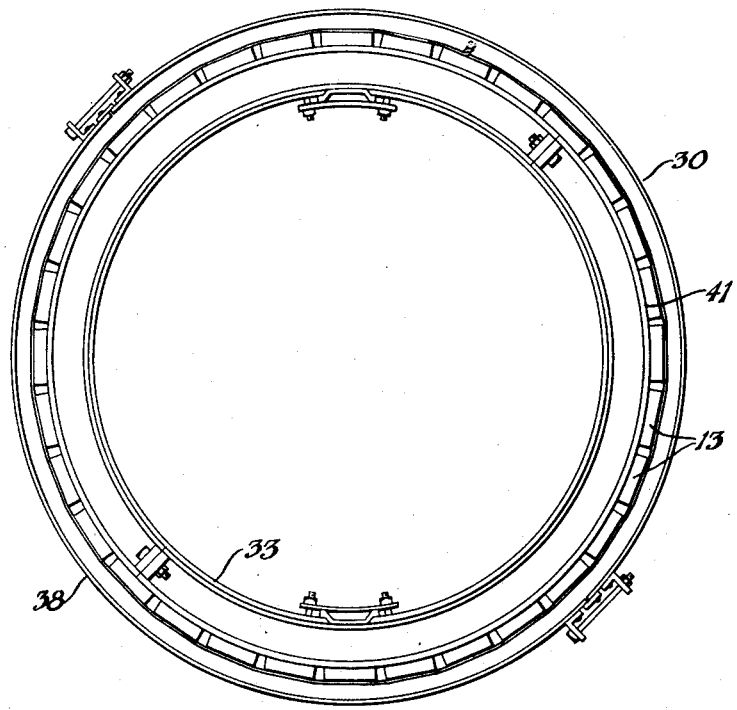

Aug. 30, 1932.  F. R. KANENGEISER  1,874,303
PIPE STRUCTURE
Filed Feb. 5, 1931  2 Sheets-Sheet 1
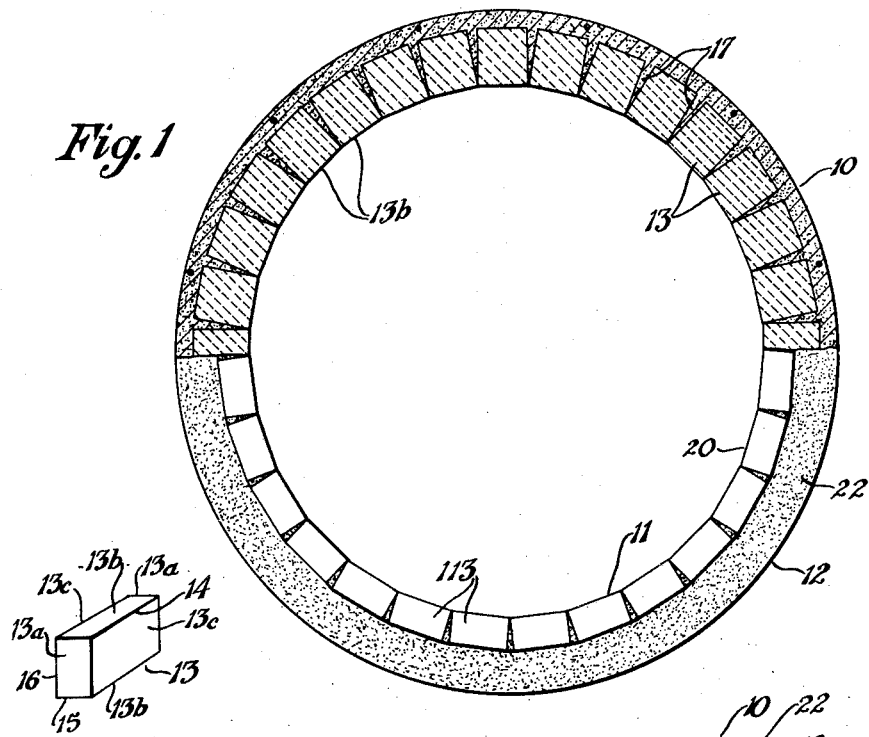
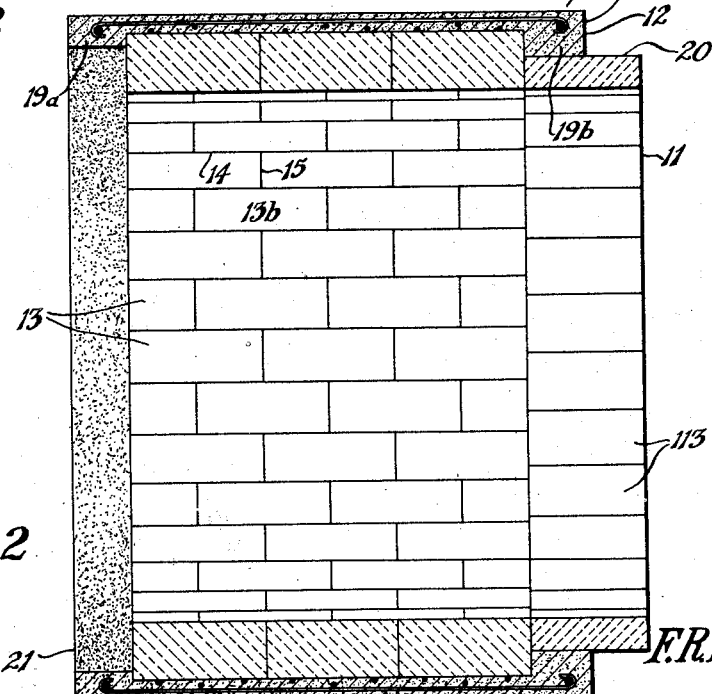

Aug. 30, 1932.  F. R. KANENGEISER  1,874,303
PIPE STRUCTURE
Filed Feb. 5, 1931  2 Sheets-Sheet 2

Inventor
F.R. Kanengeiser
By Frease and Bishop Attorneys

Patented Aug. 30, 1932

1,874,303

UNITED STATES PATENT OFFICE

FRED R. KANENGEISER, OF POLAND, OHIO, ASSIGNOR TO THE METROPOLITAN PAVING BRICK COMPANY, OF CANTON, OHIO, A CORPORATION OF OHIO

PIPE STRUCTURE

Application filed February 5, 1931. Serial No. 513,602.

My invention relates to pipe structures more particularly adapted for use as sewer pipe, and including brick as the preponderating structural element.

It is particularly desirable that a sewer pipe shall have a substantially unbroken inner surface of vitrified material.

It is also becoming more and more necessary to provide sewer pipes of relatively large diameters, which may be 3 feet or over.

In order to reduce labor costs of installation, it is preferable to utilize preformed or precast lengths of self sustaining portable pipe rather than to form the same at the place of use.

The objects of the present improvements include the provision of a novel self sustaining portable pipe structure and an improved method of making the same, the pipe structure having a substantially unbroken inner vitric surface, and being relatively economical and simple to make and use, and having unusual strength particularly in the larger diameters, as compared with brick pipe structures laid up by the methods of ordinary masonry.

The foregoing and other objects are attained by the structures, apparatus, parts, improvements, combinations, and methods, which comprise the present invention, and which are particularly and distinctly pointed out and set forth in the appended claims forming part hereof.

In general terms the improved pipe structure of the present invention comprises a pipe unit including a preferably reenforced cement grout monolithic outer shell imbedding and in keystone bonding engagement with circumferentially and longitudinally arranged preferably vitrified bricks or blocks forming an inner shell, each block preferably having a rectangular cross-section and including rectangular end faces and two sets of opposite parallel faces extending longitudinally between the end faces, the longitudinal faces of one set being narrower than the longitudinal faces of the other set, and the inner surface of the pipe being preferably formed by inner narrower longitudinal faces of the blocks abutting each other at their side and end corners to form a substantially continuous vitric surface substantially unbroken by cement; and at one end of the pipe, an end row of circumferentially arranged blocks is located with the inner broader faces of the blocks forming the inner surface of the pipe and their outer broader faces forming, with the adjacent end surface of the cement outer shell, an externally peripherally rabbeted end for the pipe unit which is adapted for interfitting with the internally peripherally rabbeted end of an adjacent pipe unit of similar construction, in which the internally peripherally rabbetted end is formed by the inner surface of the cement shell and the adjacent end surface of the brick or block shell.

In general terms the improved method of the present invention includes laying up the brick shell by abutting the ends and longitudinal corners of the bricks or blocks directly against each other, and by integrally imbedding the brick or block shell with a preferably re-enforced cement grout monolithic shell.

Figure 5:
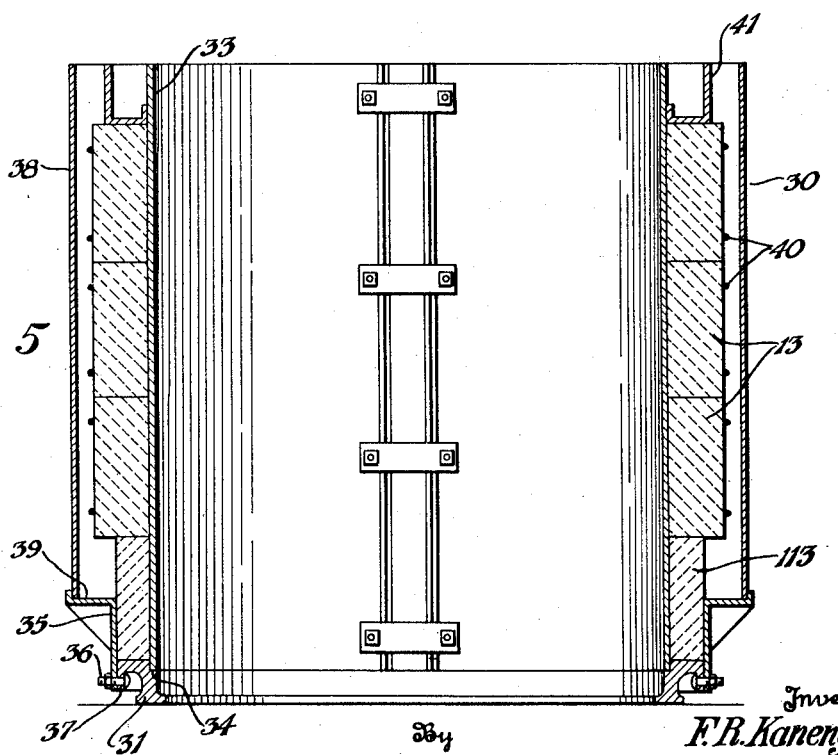

One embodiment of the improved pipe structure, and the preferred forms for carrying out the improved method hereof are illustrated in the accompanying drawings forming part hereof, in which Figure 1 is a fragmentary end view of a pipe unit embodying the present invention;

Fig. 2, a longitudinal sectional view thereof;

Fig. 3, an oblique perspective view of the preferred form of block for making the inner shell;

Fig. 4, a top plan view of the preferred forms for making the improved pipe units, the brick shell being laid up in the forms ready for the monolithic cementitious shell; and Fig. 5, a longitudinal sectional view thereof.

Similar numerals refer to similar parts throughout the drawings.

The preferred embodiment of the improved self sustaining portable pipe structure is indicated generally at 10 in Figs. 1 and 2, and is in the form of a pipe unit which includes an inner shell indicated generally by 11 and an outer shell indicated generally by 12.

The inner shell is formed by a plurality of vitrified bricks or blocks 13 which are imbedded and in preferably keystone bonding engagement with the outer shell, the outer shell being preferably made of monolithic re-enforced cement grout.

Each block 13 has any desired polygonal cross-section and includes end faces and a plurality of faces extending longitudinally between the end faces, the block faces intersecting each other at longitudinal and end corners, and one of the longitudinal faces being narrower than the adjacent longitudinal faces at each side thereof, in order that the inner surface of the pipe may be formed by the narrow faces of the block and the bonding engagement with the monolithic shell may be between broader faces of the blocks in order to attain maximum strength of the completed composite structure.

Vitrified paving brick or block provide these desired features in the most economical and convenient manner, each block 13 having a rectangular cross-section and including rectangular end faces 13a and two sets of opposite parallel rectangular faces 13b and 13c extending longitudinally between the end faces 13a, the faces 13b being narrower than the faces 13c, and the several faces of the block intersecting each other at longitudinal corners 14 and end corners 15 and 16, the end corners 15 being the narrower corners.

The inner shell 11 includes circumferentially and longitudinally arranged blocks 13, the end faces 13a of the blocks abutting directly against each other, and the inner surface of the inner shell 11 being formed by narrow faces 13b of the blocks, and the longitudinal corners 14 of the blocks as well as the end corners 15 abut against each other so that the inner surface of the completed pipe is substantially a continuous vitrified surface with substantially no cement either between the abutting end corners or longitudinal corners.

Thus providing a substantially continuous vitrified inner surface for the pipe prevents absorption of sewage by the pipe.

The blocks 13 extend in longitudinal rows and the broader faces of adjacent rows of blocks form a plurality of circumferentially spaced longitudinally extending V grooves in each of which is located a longitudinally extending keystone rib 17 which is integral with and part of the monolithic outer shell 12, and which is in bonding engagement with the adjacent broader faces of the blocks, and the outer narrower faces of the blocks are in bonding engagement with the portions of the shell 12 between the keystone ribs 17.

Re-enforcing 18 is preferably provided for the monolithic shell 12, and at the ends of the unit 10, the outer shell 12 preferably includes flanges 19a and 19b overlapping the adjacent end faces of the blocks 13, thereby imbedding the blocks 13 against endwise movement, and increasing the strength of the structure as a whole.

Each pipe unit 10 is preferably provided with one external peripherally rabbeted end 20 and an opposite internal peripherally rabbeted end 21, the external peripherally rabbeted end 20 of one unit being adapted for interfitting and being overlapped by the internal peripherally rabbeted end of an adjacent pipe unit.

The external peripherally rabbeted end 20 is formed by an end ring of blocks 113, arranged with their inner broad faces forming a continuation of the inner surface of the pipe, the blocks 113 extending beyond the end of the shell 12, and the external peripherally rabbeted end 20 being formed by the exposed portions of the outer broad faces of the blocks 113 and the end face 22 of the outer shell 12.

The internal peripherally rabbeted end 21 is formed by extending the shell 12 beyond the adjacent end of the blocks 13, as illustrated.

The improved pipe unit 10 thus described in detail would be relatively difficult to make by usual methods, but the improved method of the present invention permits the improved units 10 to be made with ease and economy.

In Figs. 4 and 5 the preferred improved forms indicated generally by 30 are illustrated for carrying out the improved method hereof.

The forms 30 include a base ring 31 which is adapted to rest upon a platform or on the ground, and an inner preferably collapsible cylindric shell 33 preferably rests upon an upper rabbeted seat 34 on the inside of the base ring, and a preferably collapsible bell ring 35 is removably secured to the outer side face of the base ring 31 as by means of bolts 36 extending through registering apertures in the bell ring 35 and a downwardly extending flange 37 provided on the base ring 31.

A preferably collapsible outer shell 38 rests upon the upper horizontal ring surface 39 of the bell ring 35, and extends upwardly therefrom concentric with the inner metallic shell 33.

Before the outer shell 38 is positioned, the brick 113 and 13 are laid up vertically end on end in rings one upon another in the positions heretofore described in the resulting pipe structure.

Tie wires 40 may be wrapped around the outer faces of the block 13, and the outer shell 38 is then positioned and an upper bell ring 41 is placed upon the upper ends of the upper ring of blocks 13.

The re-enforcing for the monolithic shell is then put in place and the monolithic shell is poured preferably by the use of cement grout.

By thus laying up the inner block shell vertically one upon another and then imbedding the blocks in the outer monolithic shell, the units 10 may be made with speed, facility, and economy.

I claim:

1. A self sustaining portable pipe structure including an inner shell and an outer shell, the inner shell including circumferentially and longitudinally arranged blocks, the blocks being rectangular in transverse cross-section and having rectangular end faces and two sets of opposite faces extending longitudinally between the end faces, the end and longitudinal faces intersecting each other at corners, and one set of faces being narrow and the other set being broad relative to each other, and the inner surface of the inner shell being formed at one end portion by broad faces of some of the blocks, and the remaining portion of the inner surface being formed by narrow faces of other blocks, and the outer shell being monolithic and imbedding and engaging the other longitudinal faces of the blocks, and an external peripherally rabbeted end being formed for the pipe structure by the outer broad faces of the said end blocks and the adjacent end surface of the outer shell.

2. A self sustaining portable pipe structure including an inner shell and an outer shell, the inner shell including circumferentially and longitudinally arranged blocks, the blocks being rectangular in transverse cross-section and having rectangular end faces and two sets of opposite faces extending longitudinally between the end faces, the end and longitudinal faces intersecting each other at corners, and one set of faces being narrow and the other set being broad relative to each other, and the inner surface of the inner shell being formed at one end portion by broad faces of some of the blocks, and the remaining portion of the inner surface being formed by narrow faces of other blocks, and the outer shell being monolithic and imbedding and engaging the other longitudinal faces of the blocks, and an external peripherally rabbeted end being formed for the pipe structure by the outer broad faces of the said end blocks and the adjacent end surface of the outer shell, and the other end of the pipe structure having formed therein an internal peripherally rabbeted seat for interfitting with the external peripherally rabbeted seat of an adjacent pipe structure.

In testimony that I claim the above, I have hereunto subscribed my name.

FRED R. KANENGEISER.